United States Patent [19]
Smits

[11] Patent Number: 5,852,363
[45] Date of Patent: Dec. 22, 1998

[54] METHODS AND APPARATUS FOR MEASURING CHARACTERISTICS OF A FORMATION AROUND A BOREHOLE USING COMPUTED FOCUSING

[75] Inventor: Jan W. Smits, Paris, France

[73] Assignee: Schlumberger Technology Corporation, Ridgefield, Conn.

[21] Appl. No.: 733,130

[22] Filed: Oct. 18, 1996

[30] Foreign Application Priority Data

Oct. 20, 1995 [FR] France ................................. 95 12348

[51] Int. Cl.$^6$ ....................................................... G01V 3/18
[52] U.S. Cl. ........................... 324/373; 324/375; 324/366
[58] Field of Search ................................... 324/373, 357, 324/366, 371, 374, 375, 358, 363

[56] References Cited

U.S. PATENT DOCUMENTS

| | | | |
|---|---|---|---|
| 4,646,026 | 2/1987 | Chemali et al. | 324/373 |
| 4,714,889 | 12/1987 | Champman et al. | 324/366 |
| 5,528,556 | 6/1996 | Seeman et al. | 367/25 |

FOREIGN PATENT DOCUMENTS

| | | |
|---|---|---|
| 540 425 | 5/1993 | European Pat. Off. . |
| 478 409 | 1/1995 | European Pat. Off. . |
| 544 583 | 12/1995 | European Pat. Off. . |
| 2 547 064 | 5/1984 | France . |
| 2 710 987 | 10/1993 | France . |
| 2 141 549 | 12/1984 | United Kingdom . |

*Primary Examiner*—Jay M. Patidar
*Attorney, Agent, or Firm*—Keith G. W. Smith

[57] ABSTRACT

A method and apparatus for determining the geometrical characteristics of a well, including insertion of a sonde of elongate shape into the well, the sonde including azimuth electrodes ($A_{azi}$), an annular current electrode ($A_0$), and at least one annular current return electrode (A). The annular current electrode ($A_0$) emits a current $I_0$, which flows essentially in a column of mud situated inside the well and returns to the annular current return electrodes. Signals are induced in response to the current $I_0$ from which can be determined the geometrical characteristics of the well. Alternative embodiments include an apparatus which is symmetrical about the azimuth electrodes. High resolution measurements are obtained by computed focusing. In a first effective operating mode, currents $i_1$ and $i'_1$ are emitted from guard electrodes $A_1$ and $A'_1$ located on either side of the current electrode ($A_0, A'_0$), the current $I_{0,1}$ emitted by the annular current electrode being equal to 0. In a second effective operating mode, a current $I_{0,2}$ is emitted from the current electrode ($A_0, A'_0$) towards the guard electrodes, the total current $I_{t,2}$ emitted from the sonde into the formation being equal to 0. Computed focusing is performed on the basis of the above two effective operating modes to simulate an operating mode in which (i) a current $I_{0,c}$ is emitted into the surrounding formation from the current electrode ($A_0, A'_0$); and (ii) the current $I_{0,c}$ is focused in the formation by emitting two currents $I_{1,c}$ and $I'_{1,c}$ from respectively the guard electrodes ($A_1, A'_1$).

23 Claims, 11 Drawing Sheets

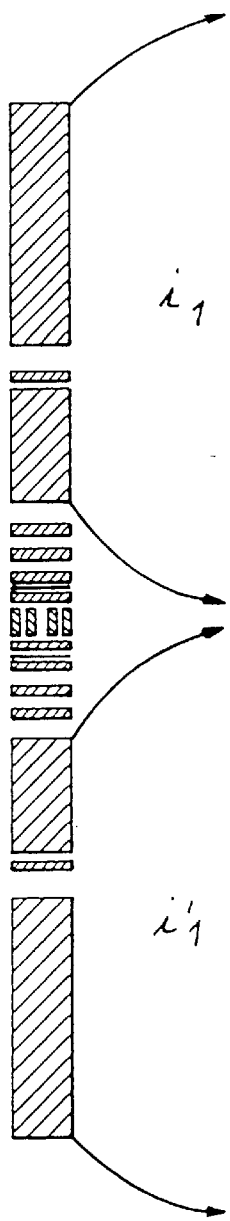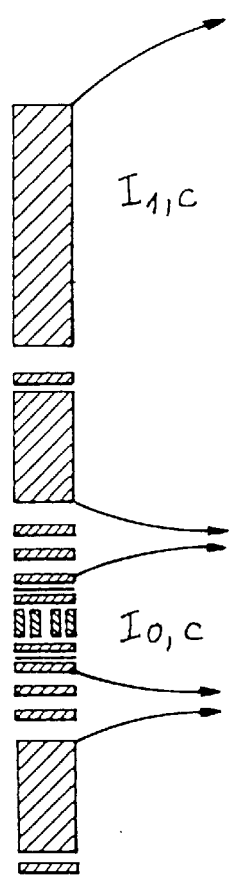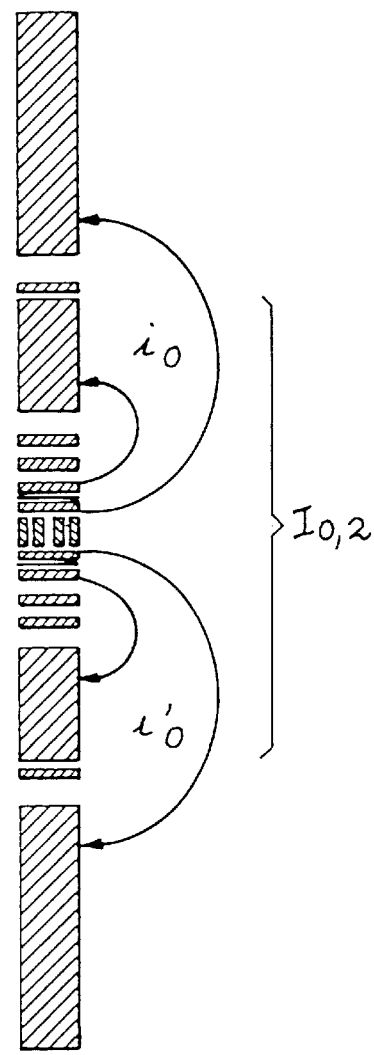
FIG. 3 A
FIG. 3 B
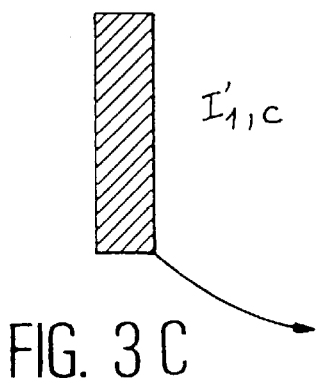
FIG. 3 C

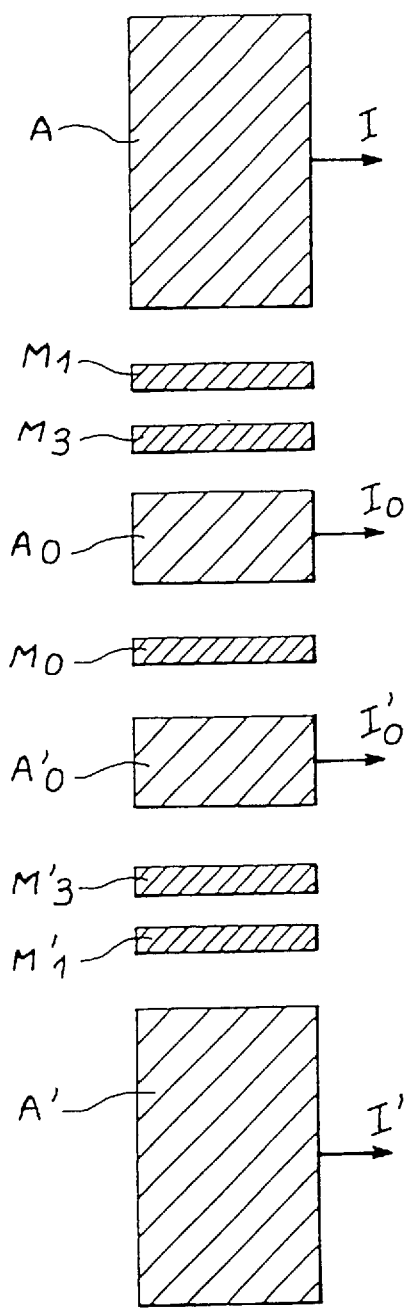
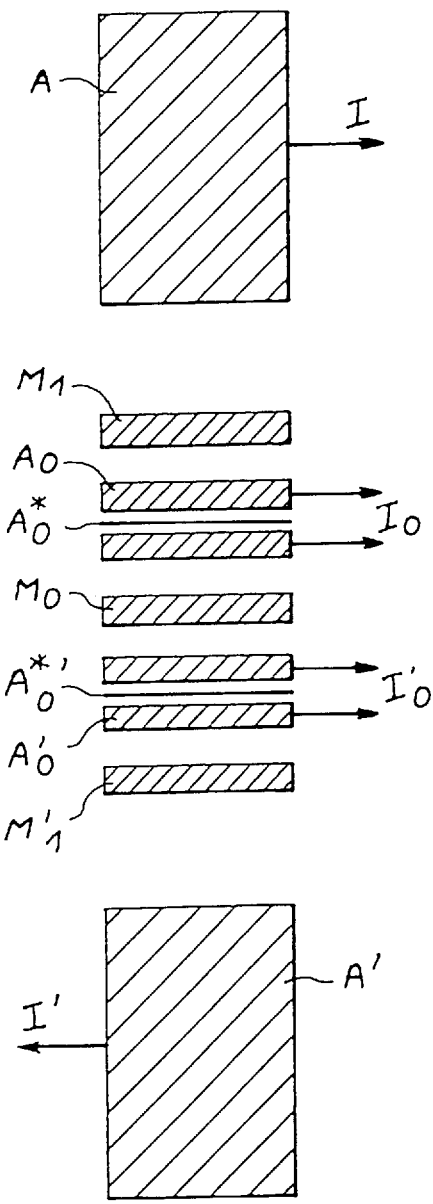
FIG. 11
FIG. 12

METHODS AND APPARATUS FOR MEASURING CHARACTERISTICS OF A FORMATION AROUND A BOREHOLE USING COMPUTED FOCUSING

BACKGROUND OF THE INVENTION

Technical Field and Prior Art

The present invention relates to the field of measurement tools, e.g. suitable for being used in equipment for oil prospecting and production.

More specifically, after a hole has been drilled, this type of activity requires sondes or sensors, in particular electrical or electromagnetic sondes or sensors to be inserted therein to perform measurements enabling, inter alia, the fluids present in the ground and layers around the borehole to be characterized, and also enabling the dip of the layers to be characterized. The term "logging" is used to designate any continues recording as a function of depth of variations in a given characteristic of the formations around a borehole.

An important characteristic to discover in a borehole is the resistivity of the surrounding ground formation, whether the resistivity is measured omnidirectionally or in azimuth, i.e. in various directions perpendicular to the axis of the borehole.

Knowledge of resistivity is fundamental in computing saturation, and resistivity may be measured in various different ways. However whatever tool is used, measurement is always based on the same principle:

current is emitted by an emitter source (e.g. an electrode) into the surrounding formations; and a measurement device situated at some distance from the source records the reactions of the surrounding formation to the signal.

Known tools enabling the resistivity of the surrounding formations to be measured include tools of the "laterolog" type.

Such a tool is described, for example, in document EP-478 409, which implements a technique of directly focusing the investigation current.

Document EP-544 583 also describes such a tool and a direct focusing technique. That document describes both a "deep" (LLd) investigation mode and a "shallow" (LLs) investigation mode. Measurements are produced, in particular measurement of the resistivity and the azimuth resistivity of the surrounding formation.

The tools described in those two documents require the investigation currents that are emitted from the annular current electrode(s) into the ground formation to be focused directly. Means must therefore be implemented for performing such focusing. In general, that requires a feedback loop for adjusting the focusing current(s) as a function, for example, of a signal representative of a focusing potential. In theory that requires amplification with infinite gain, but in practice the gain must be limited in order to ensure stability. In particular, when using focusing potential measurement electrodes, as is usually the case, the electrodes are not exactly at the same potential because of the finite gain, and that introduces error into the measurement. Even though the error is very small, particularly with standard tools of the "double laterolog" type, it can become large when the spacing between the focusing voltage measurement electrodes is small in order to improve the resolution of the apparatus.

SUMMARY OF THE INVENTION

The invention provides methods and apparatuses, e.g. for measuring formation characteristics, that avoid making use of direct focusing. In addition, the techniques described are compatible with electrode arrangements that already exist on certain sondes.

Firstly, the invention provides a method of measuring the characteristics of formations around a borehole, the method comprising:

inserting into the borehole a sonde having an elongate body provided with at least one annular current electrode and at least two annular guard electrodes, situated on either side of the annular current electrode;

in a first effective operating mode of the sonde, emitting a current $i_1$ into the surrounding formation from the annular guard electrode(s) situated at one end of the sonde relative to the current electrode(s), and a current $i'_1$ from the other annular guard electrode(s) situated at the other end of the sonde relative to the current electrode(s), the current $I_{0,1}$ emitted by the annular current electrode(s) being equal to 0;

in a second effective operating mode, emitting at least one current $I_{0,2}$ from the annular current electrode(s) towards the annular guard electrodes, the total current $I_{t,2}$ emitted from the sonde into the formation being equal to 0; and performing computed focusing on the basis of the above two effective operating modes to simulate an operating mode in which:

at least one current $I_{0,c}$ is emitted into the surrounding formation from the annular current electrode(s); and the current $I_{0,c}$ is focused in the formation by emitting two currents $I_{1,c}$ and $I'_{1,c}$ from the two annular guard electrodes situated on either side of the annular current electrode.

This method does not require focusing to be performed directly, and it makes use solely of focusing by computation. Since the simulation is generally performed by computing devices on the surface, the measurement tool itself is considerably simplified. In addition, insofar as no focusing is performed directly while measurements are being made, there is no need for focusing current control and/or regulation means. This avoids all of the focusing current feedback loops.

This first method thus performs "deep" computed focusing (LLd).

The invention also provides a method of measuring the characteristics of formations around a borehole, the method comprising:

inserting a sonde into the borehole, the sonde having an elongate body provided with at least one annular current electrode; and towards a first end relative to the current electrode(s), first and second annular guard electrodes; and.

towards the other end relative to the current electrode(s), third and fourth annular guard electrodes;

in a first effective operating mode, emitting:

currents $i_2$, $i'_2$ from the first and third annular guard electrodes towards the second and fourth annular guard electrodes; and the current $I_{0,1}$ emitted from the annular current electrode(s) and the total current $I_{t,1}$ emitted from the sonde into the formation both being equal to 0;

in a second effective operating mode, emitting at least one current $I_{0,2}$ from the annular current electrode(s) towards the annular guard electrodes, the total current $I_{t,2}$ emitted from the sonde into the formation being equal to 0; and performing computed focusing to simulate an operating mode in which:

at least one current $I_{0,c}$ is emitted into the surrounding formation from the annular current electrode(s); and the current $I_{0,c}$ is focused in the formation by emitting two currents $I_{1,c}$ and $I'_{1,c}$ from the annular guard electrodes.

Like the first method, this method makes it possible to avoid performing focusing directly, replacing direct focusing with computed focusing. Like the first method, this second method is compatible with electrode structures that are to be found on known sondes. Also, both methods are mutually compatible: they can be implemented using the same electrode structure on the same sonde.

The second method makes it possible to perform "shallow" computed focusing (LLs).

In both cases, use is made of a "deep" first mode and of a shallower second mode, i.e. two modes of different investigation depths.

It will also be observed that both methods described implement a common second mode with shallow penetration currents.

Finally, it is shown that the same types of measurement can be produced with both methods: omnidirectional formation resistivity, formation resistivity in azimuth.

Thus, each of the methods can be followed by a step during which signals are produced that are representative of one or more characteristics of the surrounding media (omnidirectional resistivity or azimuth resistivity).

In all cases, for each effective mode of operation, signals can be produced representative of a "focusing" voltage $\Delta V_{f,i}$ (i=1,2) and of a "sonde" voltage $\Delta V_{s,i}$ (i=1,2), and in the second mode, a signal representative of the currents $I_{0,2}$ emitted from the current electrode.

In a first computing technique, a weighting coefficient is deduced for a linear combination of the two real or "effective" operating modes of the sonde, so as to obtain a computed mode for which the resulting focusing voltage is zero.

In another computation technique, applicable to the first above-described method, for the first mode, there is also produced a signal representative of total current $I_{t,1}$ emitted into the formation, and in which transfer impedances or coefficients are deduced between:

firstly the focusing voltage and the sonde voltage; and secondly the current emitted from the current electrode(s) and the total current emitted into the formation.

In another computation technique, for the first mode, there are also produced signals representative of the voltage differences between firstly the first and second guard electrodes and secondly the third and fourth guard electrodes, and in which transfer impedances or coefficients are deduced between: firstly the focusing voltage and the sonde voltage; and secondly the current emitted from the current electrode (s) and the voltage difference between two guard electrodes.

The invention also relates to apparatus for implementing the first above-described method.

Thus, the invention also provides apparatus for measuring the characteristics of formations around a borehole, the apparatus comprising:

a sonde having an elongate body provided with at least one annular current electrode and at least two annular guard electrodes, situated on either side of the annular current electrode;

means for use in a first effective operating mode to emit a current $i_1$ into the surrounding formation from one of the annular guard electrodes, and a current $i'_1$ from the other annular guard electrode, the current $I_{0,1}$ emitted by the annular current electrode(s) being equal to 0;

means for use in a second effective operating mode to emit at least one current $I_{0,2}$ from the annular current electrode(s) towards the annular guard electrodes, the total current $I_{t,2}$ emitted from the sonde into the formation being equal to 0; and means for use in both of the above effective operating modes to perform computed focusing in such a manner as to simulate an operating mode in which:

at least one current $I_{0,c}$ is emitted into the surrounding formation from the annular current electrode(s): and the current $I_{0,c}$ is focused in the formation by emitting two currents $I_{1,c}$ and $I'_{1,c}$ from the two annular guard electrodes situated on either side of the annular current electrode.

The above apparatus serves to implement the first above-described method with all of the advantages associated therewith.

Another apparatus serves to implement the second above-described method. This apparatus comprises:

a sonde having an elongate body provided with at least one annular current electrode and:

towards one end relative to the current electrode(s), first and second annular guard electrodes; and towards the other end relative to the current electrode (s), third and fourth annular guard electrodes;

means for use in a first effective operating mode to emit:

currents $i_2$, $i'_2$ from the first and third annular guard electrodes towards the second and fourth annular guard electrodes; and the current $I_{0,1}$ emitted from the annular current electrode (s) and the total current $I_{t,1}$ emitted from the sonde into the formation both being equal to 0;

means for use in a second effective operating mode to emit at least one current $I_{0,2}$ from the annular current electrode(s) towards the annular guard electrodes, the total current $I_{t,2}$ emitted from the sonde into the formation being equal to 0; and means for implementing computed focusing on the basis of the two above effective operating modes so as to simulate an operating mode in which:

at least one current $I_{0,c}$ is emitted into the surrounding formation from the annular current electrode; and the current $I_{0,c}$ is focused in the formation by emitting two currents $I_{1,c}$ and $I'_{1,c}$ from the two annular guard electrodes situated on either side of the annular current electrode.

This second apparatus is compatible with the first in the sense that a single tool can be used for both of them. In addition, the means for implementing computed focusing, which are essentially computer means, can also be common. Thus, the user has equipment that can be used, at will, for deep computed focusing (LLd) and/or for shallow computed focusing (LLs).

Both apparatuses implement a second effective mode of operation which is identical, thereby reinforcing their compatibility still further.

In both cases, means may be provided for producing signals representative of one or more characteristics of the surrounding media, e.g. the omnidirectional resistivity or the azimuth resistivity of the formation.

In two variants, the sonde may include:

either a single current electrode together with three pairs of potential measuring electrodes disposed on either side of the current electrode;

or else two annular current electrodes together with either one annular potential electrode disposed between the two current electrodes, or else an array of azimuth electrodes disposed between the two current electrodes, and two pairs of annular potential-measuring electrodes, one of which is situated on either side of the annular current electrodes.

The second variant makes it possible to perform high resolution measurements. It is then also possible to perform simultaneously high resolution measurements and standard resolution measurements.

Finally, the invention also provides apparatus for measuring the characteristics of formations around a borehole, the apparatus comprising:

a sonde having an elongate body provided with at least one annular current electrode and:
  at one end relative to the current electrode(s) first and second annular guard electrodes; and
  at the other end relative to the current electrode(s), third and fourth annular guard electrodes;

means for use in a first effective operating mode to emit a current $i_1$ into the surrounding formation from the first and second annular guard electrodes, and for emitting a current $i'_1$ from the third and fourth annular guard electrodes, the current $I_{0,1}$ emitted by the annular current electrode(s) being equal to 0;

means for use in a second effective operating mode to emit:

currents $i_2$ and $i'_2$ from the first and third annular guard electrodes towards the second and fourth annular guard electrodes; and the current $I_{0,1}$ emitted from the annular current electrode(s) and the total current $I_{t,1}$ emitted from the sonde into the formation both being equal to 0;

means for use in a third effective operating mode to emit at least one current $I_{0,2}$ from the annular current electrode(s) towards the annular guard electrodes, the total current $I_{t,2}$ emitted from the sonde into the formation being equal to 0; and means for performing one or more computed focusing operations on the basis of the effective operating modes so as to simulate one or more operating modes in which:
  at least one current $I_{0,c}$ is emitted into the surrounding formation from the annular current electrode; and
  the current $I_{0,c}$ is focused in the formation by emitting two currents $I_{1,c}$ and $I'_{1,c}$ from the two annular guard electrodes situated on either side of the annular current electrode.

BRIEF DESCRIPTION OF THE DRAWINGS

In any event, the characteristics and advantages of the invention appear better in the light of the following description. The description relates to embodiments given for explanatory and non-limiting purposes, and with reference to the accompanying drawings, in which:

FIGS. 3A to 3C are diagrams showing effective operating modes for implementing a method of the invention, together with the mode that results from combining the effective modes;

FIGS. 5 and 9 to 12 show other electrode structures for implementing methods of the invention;

FIGS. 6A to 7B are graphs of hole correction factors at high resolution and at standard resolution;

DETAILED DESCRIPTION OF EMBODIMENTS OF THE INVENTION

Figure 1:
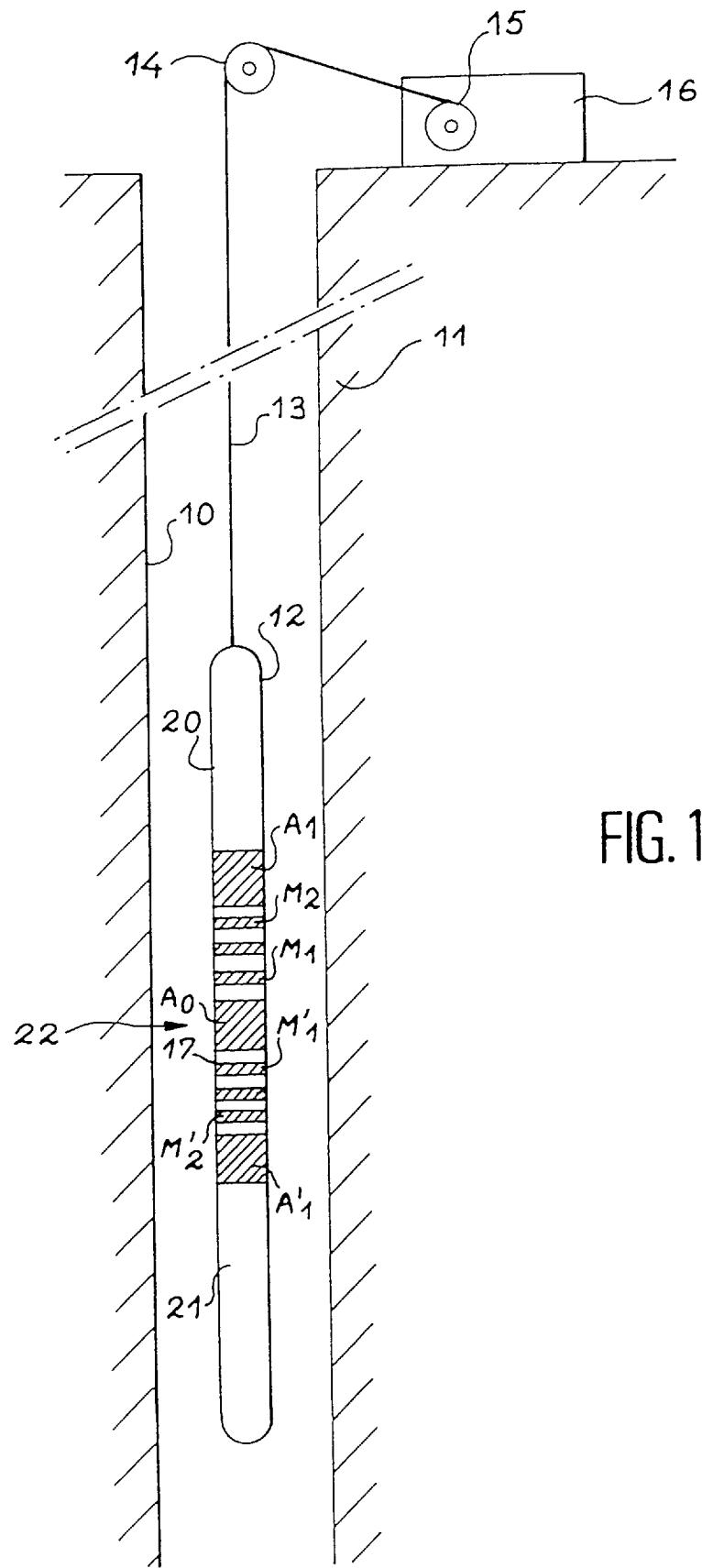
FIG. 1 shows logging apparatus comprising a sonde having electrodes disposed thereon and suitable for performing measurements in accordance with the invention.

Overall implementation of the invention is initially shown diagrammatically in FIG. 1 where there can be seen logging apparatus enabling the characteristics of terrestrial formations 11 surrounding a well or borehole 10 to be determined. The apparatus comprises a sonde 12 which is suspended down the borehole at the end of a multiconductor cable 13. The cable 13 passes over a sheave 14 and is wound on a drum 15 which serves to move the sonde 12 along the borehole. The drum 15 forms part of a surface unit 16 which may also include means for computer processing data measured by the sonde while it is being displaced in the borehole.

The sonde 12 is elongate in shape. It comprises a body 17 having a top portion 20 made of a metal case enclosing electrical circuits, and a bottom portion 21 including an array 22 of electrodes making it possible, in particular, to determine the resistivity of surrounding formations or of drilling mud. By way of example, the sonde may be used in combination with apparatus as described in document FR-2 710 987.

One such array 22 of electrodes is described below in the context of a first embodiment, and with reference to FIG. 2.

This figure is a diagrammatic representation of the array of electrodes on its own, i.e. without the body of the sonde. The array of electrodes comprises firstly a pair $A_0$, $A_0'$ of annular current electrodes. Between these current electrodes there is disposed an array of azimuth electrodes $A_{azi}$. There are N such electrodes distributed around a circumference of the body 17 of the sonde. Potential measuring electrodes $M_1$, $M'_1$, $M_2$, $M'_2$ and $A_0^*$, $A_0^{*'}$ are provided. In FIG. 2, the electrodes $A_0^*$ and $A_0^{*'}$ subdivide each current electrode into two portions; thus, a portion of current electrode $A_0$ is situated above the potential measuring electrodes $A_0^*$, and a portion of $A_0$ is situated beneath a $A_0^*$, and the same applies for $A_0'$ and $A_0^{*'}$. This disposition makes it possible to perform measurements that are more accurate when variations in contact impedance occur at the surfaces of the current electrodes. At either end of this set of electrodes, there are two pairs of annular electrodes $M_1$, $M'_1$ and $M_2$, $M'_2$ referred to as voltage or potential measuring electrodes. Beyond that, at either end of the probe, there is at least one guard electrode. In the example of FIG. 2, there are four guard electrodes: first and second guard electrodes $A_1$ and $A_2$ being situated in the top portion of the set of electrodes, while third and fourth guard electrodes $A'_1$ and $A'_2$ are situated in the bottom portion of the set of electrodes. Electrodes $A_1^*$ and $A_1^{*'}$ are also provided to measure potential in the mud column close to the electrodes $A_1$ and $A'_1$.

Figure 2:
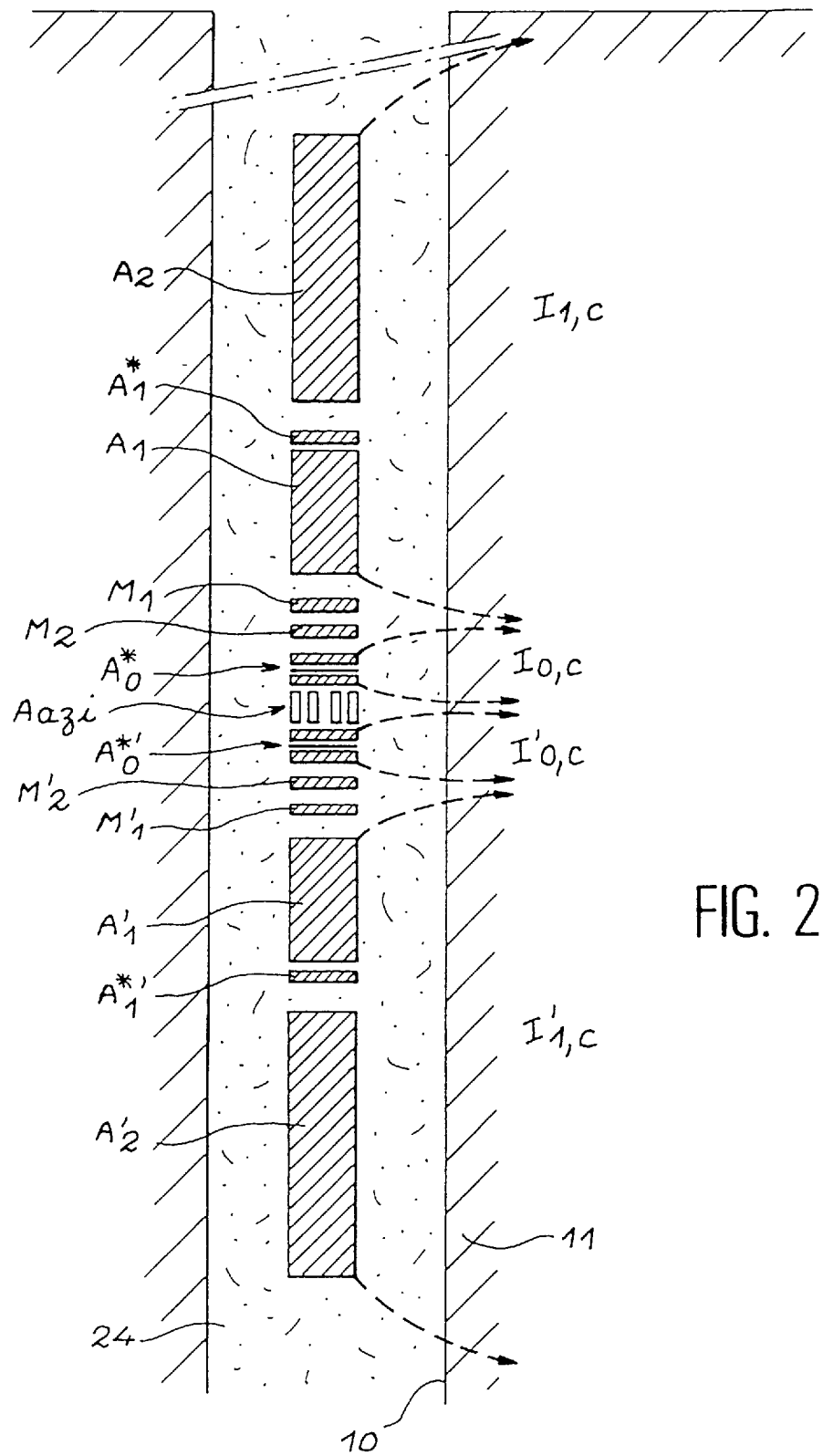
FIG. 2 shows a first embodiment of apparatus for implementing the invention.

FIG. 2 also shows, in diagrammatic manner, the relative disposition of the set of electrodes, of the borehole 10 (including drilling mud 24), and of the formations 11. Current lines $I_{0,c}$, $I'_{0,c}$ and focusing currents $I_{1,c}$ and $I'_{1,c}$ as obtained by deep computed focusing are also shown. These currents are not effectively used, but they are deduced from effective operating modes described below with reference to FIGS. 3A to 3C and 4A to 4C.

In FIGS. 3A to 3C the same arrangement of electrodes is used as that described above with reference to FIG. 2.

In a first effective operating mode (FIG. 3A), currents $i_1$ and $i'_1$ of great penetration depth into the surrounding formations are emitted from the guard electrodes. At infinity, these currents return to the surface. In this first effective operating mode, the current electrodes $A_0$ and $A'_0$ do not emit any current, and the potential difference $\Delta V_{a,1}$ between the electrodes $A_1^*$ and $A_2$ is equal to the potential difference between the electrodes $A'^*_1$ and $A'_2$ ($V_{A1}^* + V_{A1}^{*'} = V_{A2} + V_{A2}'$).

The second effective operating mode (FIG. 3B) emits current with low penetration depth into the surrounding formations. A current $I_{0,2} = i_0 + i'_0$ is emitted from the current electrodes $A_0$, $A'_0$ towards the guard electrodes $A_1$, $A_2$ and $A'_1$, $A'_2$. Here again, the potential difference $\Delta V_{a,2}$ between $A_1^*$ and $A_2$ is kept equal to the potential difference between $A'^*_1$ and $A'_2$ ($V_{A1}^* + V_{A1}^{*'} = V_{A2} + V_{A2}'$). The total current $I_{t,2}$ emitted into the formation is zero.

FIG. 3C shows the investigation current $I_{0,c}$ and the focusing currents $I_{1,c}$ and $I'_{1,c}$ obtained using computed focusing, e.g. implementing one of the techniques described below.

Figure 5:
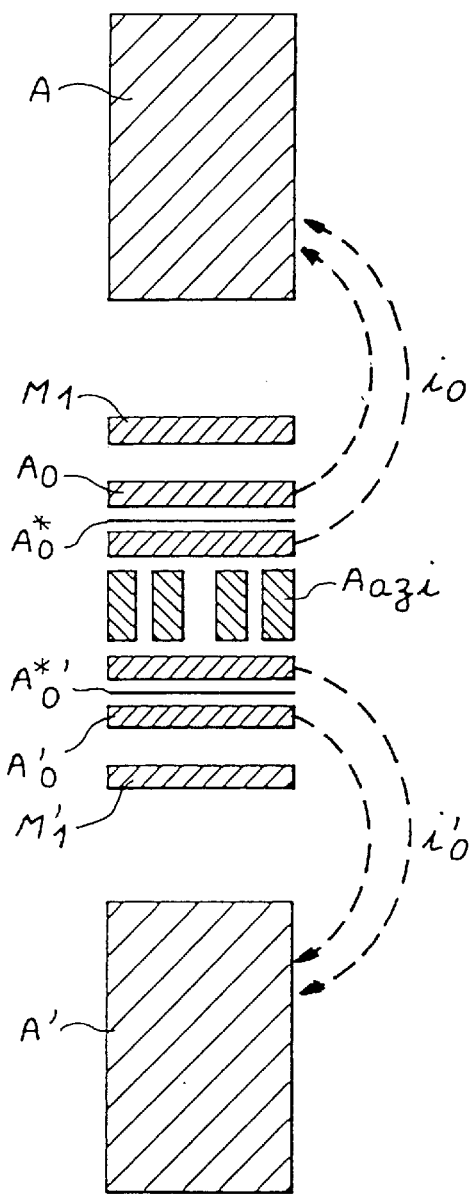

Since both of the effective operating modes of FIGS. 3A and 3B impose the above condition on the potential difference $\Delta V_{a,i}$ (i=1,2), it is possible to implement them using the electrode structure of FIG. 5. This structure is essentially the same as the structure described above, with the sole difference being that the annular guard electrodes at either end of the sonde are united to form single annular guard electrodes A and A'. As in the preceding structures, the structure of FIG. 5 makes it possible to emit currents $i_1$ and $i'_1$ from the guard electrodes A, A' (effective mode 1) and to emit currents $i_0$ and $i'_0$ (total current $I_{0,2} = i_0 + i'_0$) from the current electrodes $A_0$ and $A'_0$ to the guard electrodes A, A' (effective mode 2).

Figure 4:
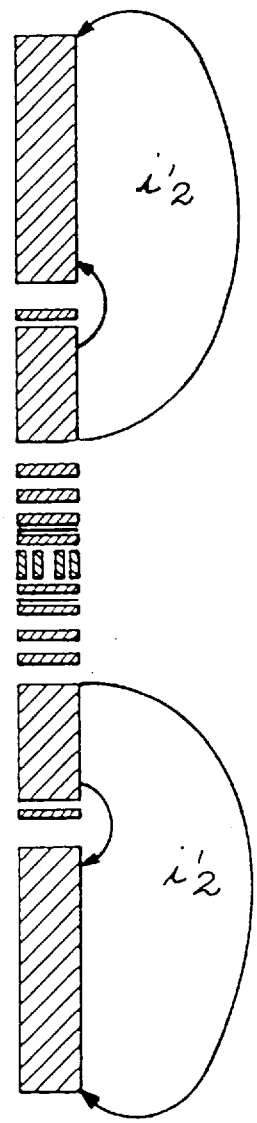
FIGS. 4A to 4C are diagrams showing other effective modes of operation for implementing a method of the invention, together with the mode that results from combining the two effective modes.
Figure 4:
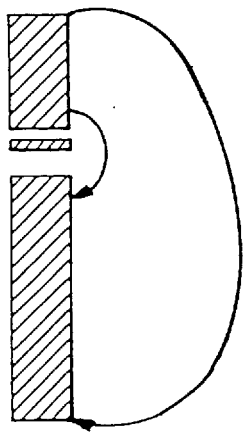
Figure 4:
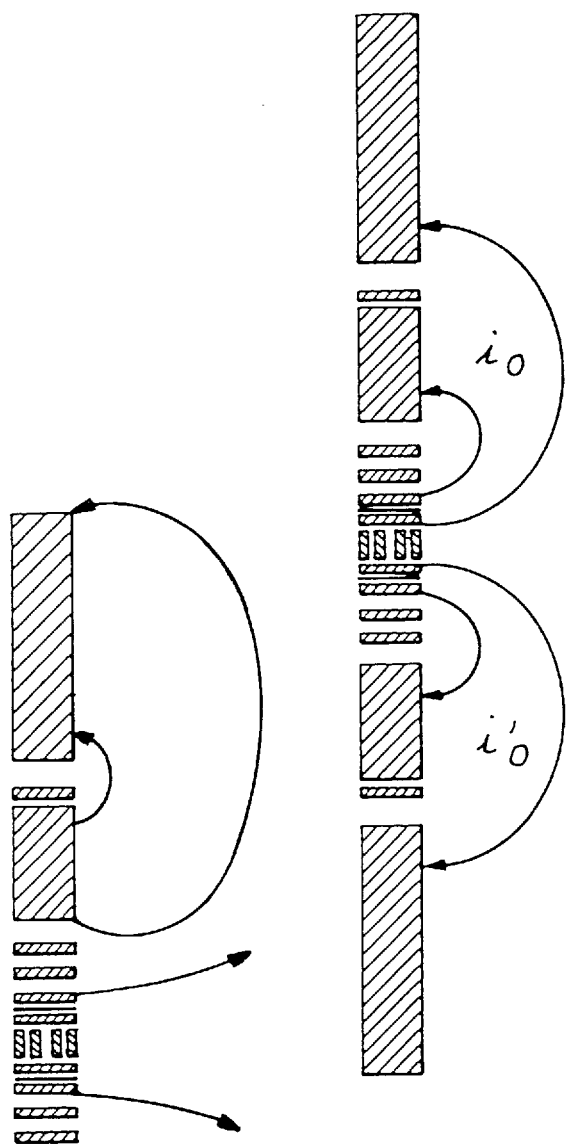

Another pair of effective operating modes which can be implemented for a computed focusing method of the invention is described below with reference to FIGS. 4A and 4B. In the mode of FIG. 4A, no investigation current is emitted from the current electrodes into the formation ($I_{0,1}$ 32 0) and the total current emitted from the sonde into the formation is zero ($I_{t,1}=0$) This time the potential difference $\Delta V_{a,1} = V_{A1}^* + V_{A1}^{*'} - V_{A2} - V_{A2}'$ is not equal to zero. On applying voltage, because of the conductivities of the surrounding elements (mud, formation) guard currents $i_2$, $i'_2$ appear going from the guard electrodes $A_1$ and $A'_1$ towards the electrodes $A_2$ and $A'_2$: these currents have a penetration depth that is intermediate between the effective operating mode described above with reference to FIG. 3B and the effective operating mode described above with reference to FIG. 3A. That is why the penetration depth of these currents is called "medium".

The effective operating mode of FIG. 4B is identical to the effective operating mode as described above with reference to FIG. 3B.

FIG. 4C shows the currents obtained in computed mode using a technique that is explained below. The difference between the current structures of FIGS. 3C and 4C shows that in the first case (FIG. 3C) focusing is performed over a large depth (deep computed focusing LLd), whereas in the second case focusing takes place only over a shallower depth (shallow computed focusing, LLs).

A sonde or apparatus for implementing the invention may be designed to operate in all three above-described modes.

The various modes (FIGS. 3A, 3B, and 4A) may be implemented simultaneously, at different frequencies. For example, the mode using current emission with great penetration depth (FIG. 3A) may be implemented at 35 Hz, the mode having current emitted with shallow penetration depth (FIGS. 3B, 4B) is implemented at 162 Hz, and the mode with current being emitted at medium penetration depth (FIG. 4A) is implemented at 288 Hz. If the frequencies chosen are equal or similar, then the effective operating modes are preferably implemented in succession.

While these modes are operating, signals representative of a "focusing" voltage $\Delta V_{f,i}$ (i=1,2 for each occasion on which each of the two modes is implemented), and signals representative of a "sonde" voltage $\Delta V_{s,i}$ (i=1,2 on each occasion each of the two modes is implemented) may be taken and measured. A signal or signals representative of the resistivity of the formation may be deduced by simulation after computing the focused mode.

It is thus possible to calculate the respective weights to be given to the two effective operating modes so that they can be combined in linear manner to obtain an operating mode in which a focusing condition is satisfied.

In a variant, it is possible to use data measured during effective operating modes to compute transfer impedances which make it possible to associate a focusing potential and a sonde potential:

either to the current emitted from the current electrode(s) and to the total current emitted into the formation;

or else to the current emitted from the current electrode(s) and to the voltage difference between the two guard electrodes.

After the transfer impedances have been calculated, it is possible to deduce sonde voltage values and investigation current values for which a focusing condition is satisfied.

In general, it is considered that an operating mode, whether effective or simulated, is fully described by the data from the investigation current(s), the total current emitted into the formation, a focusing voltage, a sonde voltage, and a voltage difference between two adjacent guard electrodes. In some cases, some of these values may be of no importance, as is the case in FIGS. 3A and 3B for which the last-mentioned value is zero ($\Delta Va$=voltage difference between the electrodes $A_1$ and $A_2$=voltage difference between the electrodes $A'_1$ and $A'_2$=0).

Similarly, when combining the effective modes of FIGS. 4A and 4B, the total current emitted into the formation is zero in both effective modes, with the resultant total current emitted into the formation in the resulting computed mode likewise being zero.

In the electrode structure of FIG. 2:

the focusing voltage may be the voltage $V_1 - <V_{zk}>$, where $V_1$ is the mean potential of the electrodes $M_1$ and $M'_1$ and $<V_{zk}>$ is the mean potential of the azimuth electrodes $A_{azk}$ (high resolution); alternatively it may be $V_1 - V_2$, where $V_1$ (i=1,2) is the mean potential of the electrodes $M_i$ and $M'_i$ (standard resolution); the voltage of the sonde is equal to $V_1 - V_r$ where $V_1$ has the meaning given above and where $V_r$ is the remote reference potential, e.g. on the cable 13.

The first computation technique is now described in greater detail. For each mode, the investigation current is written $I_0$, the sonde voltage is written $\Delta V_S$, and the focusing voltage is written $\Delta V_f$.

The corresponding quantities for mode number i (i=1, 2 or c, where c is the index for computed mode) are written $I_{0,i}$, $\Delta V_{S,i}$ and $\Delta V_{f,i}$, where i is then described by the following column vector:

$$\begin{pmatrix} \Delta V_{s,i} \\ \Delta V_{f,i} \\ I_{0,i} \end{pmatrix}$$

The condition for computed focusing is written: $\Delta V_{f,c}=0$, and the weighting of the two modes is written using the coefficient $\lambda$. It is therefore necessary to find $\lambda$ such that:

$$\lambda \begin{pmatrix} \Delta V_{s,1} \\ \Delta V_{f,1} \\ I_{0,1} \end{pmatrix} + \begin{pmatrix} \Delta V_{s,2} \\ \Delta V_{f,2} \\ I_{0,2} \end{pmatrix} = \begin{pmatrix} \Delta V_{s,c} \\ 0 \\ I_{0,c} \end{pmatrix}$$

This equality is satisfied for:

$$\lambda = -\frac{\Delta V_{f,2}}{\Delta V_{f,1}}$$

from which it can be deduced:

$$\Delta V_{s,c} = -\left(\frac{\Delta V_{f,2}}{\Delta V_{f,1}}\right) \Delta V_{s,1} + \Delta V_{s,2}$$

and $$I_{0,c} = -\left(\frac{\Delta V_{f,2}}{\Delta V_{f,1}}\right) I_{0,1} + I_{0,2} = I_{0,2}$$

The resistivity of the formation can be deduced therefrom:

$$R_m = \left(\frac{\Delta V_{s,c}}{I_{0,C}}\right) K'' = K'' \times \frac{\Delta V_{s,2} - \left(\Delta V_{s,1} \frac{\Delta V_{f,2}}{\Delta V_{f,1}}\right)}{I_{0,2}} \quad (1)$$

where K" is a coefficient which depends on the geometry of the sonde.

The data obtained on the voltages and the currents of the effective modes may, for example, be measured and then stored in data storage means. The coefficient $\lambda$ is computed and the resistivity is obtained subsequently, e.g. using a known type of computer specially programmed for implementing this type of computation. The computer may be contained in the surface unit 16 (see FIG. 1), for example.

In another computation technique, a matrix A is initially computed enabling the following vectors:

$$V = \begin{pmatrix} \Delta V_{f,i} \\ \Delta V_{s,i} \end{pmatrix}$$

and $$I = \begin{pmatrix} I_{0,i} \\ I_{t,i} \\ \Delta V_{a,i} \end{pmatrix}$$

to be associated by the following relationship:

$$V = A \cdot I$$

($I_{t,i}$, where c represents the total current emitted into the formation.)

A is a 2×3 matrix whose coefficients are written as follows:

$$A = \begin{pmatrix} a & b & c \\ d & e & f \end{pmatrix}$$

For the first two effective modes (respectively having deep and shallow penetration, as shown in FIGS. 3A and 3B), four equations are therefore obtained:

$\Delta V_{f,1} = b I_{t,1}$ $\Delta V_{s,1} = e I_{t,1}$ $\Delta V_{f,2} = a I_{0,2}$ $\Delta V_{s,2} = d I_{0,2}$ from which it is possible to deduce the four coefficients or transfer impedances a, b, d, and e.

The condition for deep focusing (LLd) is written: $\Delta V_{f,c}=0$ and $\Delta V_{a,c}=0$. The second portion of the condition is automatically satisfied since $\Delta V_{a,i}=0$ (i=1,2) in both effective operating modes under consideration. Thereafter, it suffices to look for voltages $\Delta V_s$ and currents $I_0$ satisfying:

$$\begin{pmatrix} 0 \\ \Delta V_{s,c} \end{pmatrix} = \begin{pmatrix} a & b \\ d & e \end{pmatrix} \begin{pmatrix} I_{0,c} \\ I_{t,c} \end{pmatrix}$$

For the other two effective modes (respectively having shallow and medium penetration depths, as shown in FIGS. 4A and 4B), the following four equations are obtained:

$\Delta V_{f,1} = c \Delta V_{a,1}$ $\Delta V_{s,1} = f \Delta V_{a,1}$ $\Delta V_{f,2} = a I_{0,2}$ $\Delta V_{s,2} = d I_{0,2}$ from which it is possible to deduce four coefficients or transfer impedances a, b, d, and e. The condition for shallow focusing is written $\Delta V_{f,c}=0$ and $I_{t,c}=0$. Thereafter it suffices to look for voltages $\Delta V_{,c}$ and currents $I_0$ which satisfy: ,c $$\begin{pmatrix} 0 \\ \Delta V_{s,c} \end{pmatrix} = \begin{pmatrix} a & b & c \\ d & e & f \end{pmatrix} \begin{pmatrix} I_{0,c} \\ 0 \\ \Delta V_{a,c} \end{pmatrix}$$

In all cases, the resistivity of the formation can be deduced therefrom, which resistivity is proportional to:

$$(\Delta V_{s,c}/I_{0,c}) = (d - e(a/b)) \quad (2)$$

The proportionality factor is different for the two computed focused modes, i.e. deep mode (LLd) and shallow mode (LLs).

By replacing the transfer impedances with the values obtained from the voltages and currents measured for the effective modes, the expression is reduced to that of the first equation (1) given above for resistivity.

This second computation technique requires measured values of currents and of voltages for the effective modes to be stored, and it implements a subsequent step of computing transfer impedances. The computation may be performed by a computer of known type programmed appropriately for implementing this type of computation.

When the sonde includes an array of azimuth electrodes, as in the structures described above with reference to FIGS. 2 and 5, it is also possible to implement measurement of azimuth resistivity of the formation. Thus, a measurement is obtained of the resistivity of the formation in a particular direction about the sonde as defined by one of the azimuth electrodes. The result may be obtained for a computed focusing mode that is deep (LLd) or shallow (LLs). The investigation currents which flow in the formation generate a voltage in the mud column, and this voltage is measured between the azimuth electrodes and the reference electrodes A0* and A0*'. For each azimuth electrode j, it is therefore necessary to consider the voltage difference $\Delta V_{azij}$ between the potential of azimuth electrode i and the mean potential of the electrodes $A_0$* and $A_0$*', where the index j=1,2,c designates one of the two effective operating modes or the computed mode. The azimuth resistivity in direction k is proportional to:

$$\frac{\Delta V_{s,c}}{I_{0,c}} \times \frac{\sum_{i=1}^{N} \Delta V_{azi,c}}{N \Delta V_{azk,c}}$$

where $\Delta V_{azi,c}$ (value of $\Delta V_{azi}$ in focused mode) is given by:

$$\Delta V_{azi,c} = \Delta V_{azi,2} - \frac{\Delta V_{f,2}}{\Delta V_{f,1}} \Delta V_{azi,1}$$

where c designates one or other of the computed focused modes, deep (LLd) or shallow (LLs).

The measurements performed with an electrode structure such as that described above with reference to FIGS. 2 or 5 are high resolution measurements: this is due to the presence in the center of the sonde, i.e. between the two annular current electrodes $A_0$ and $A'_0$, of an array of voltage measuring electrodes. Under such conditions, the width of a computed investigation current is narrower than when two pairs of annular voltage measuring electrodes are disposed on either side of the current electrodes.

In particular, in the structure of FIG. 2, it is possible to select a focusing voltage equal to $V_1 - \langle V_{zk} \rangle$, or to $V_1 - V_2$. The first case corresponds to high resolution measurement while the second corresponds to measurement at "normal" or "standard" resolution.

Figure 6:
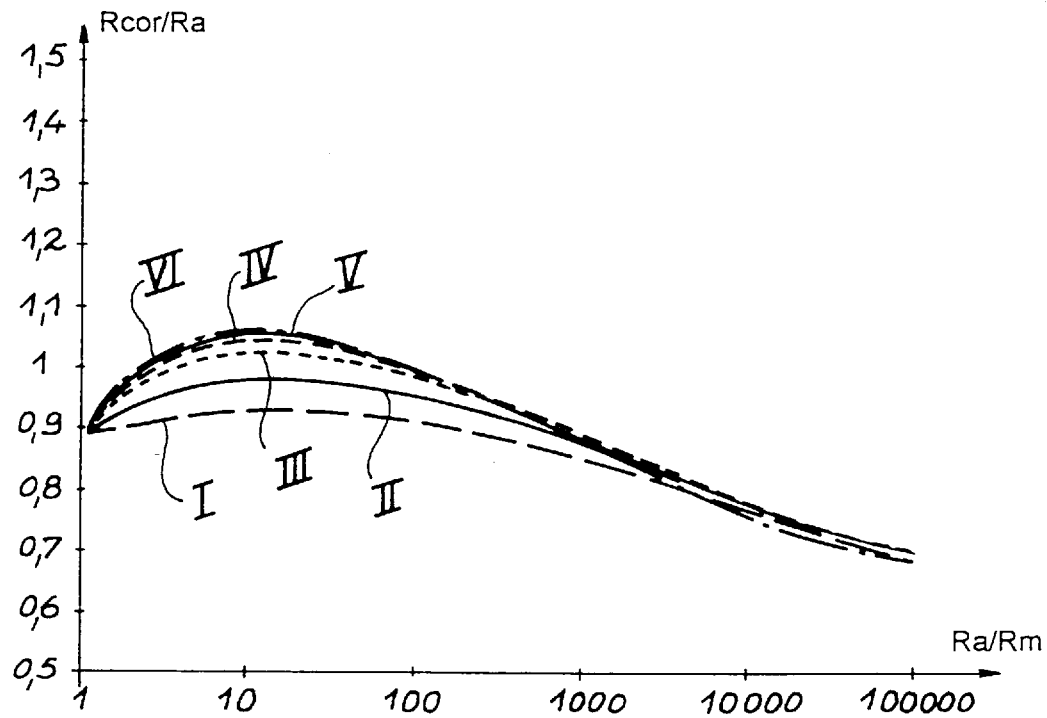
Figure 6:
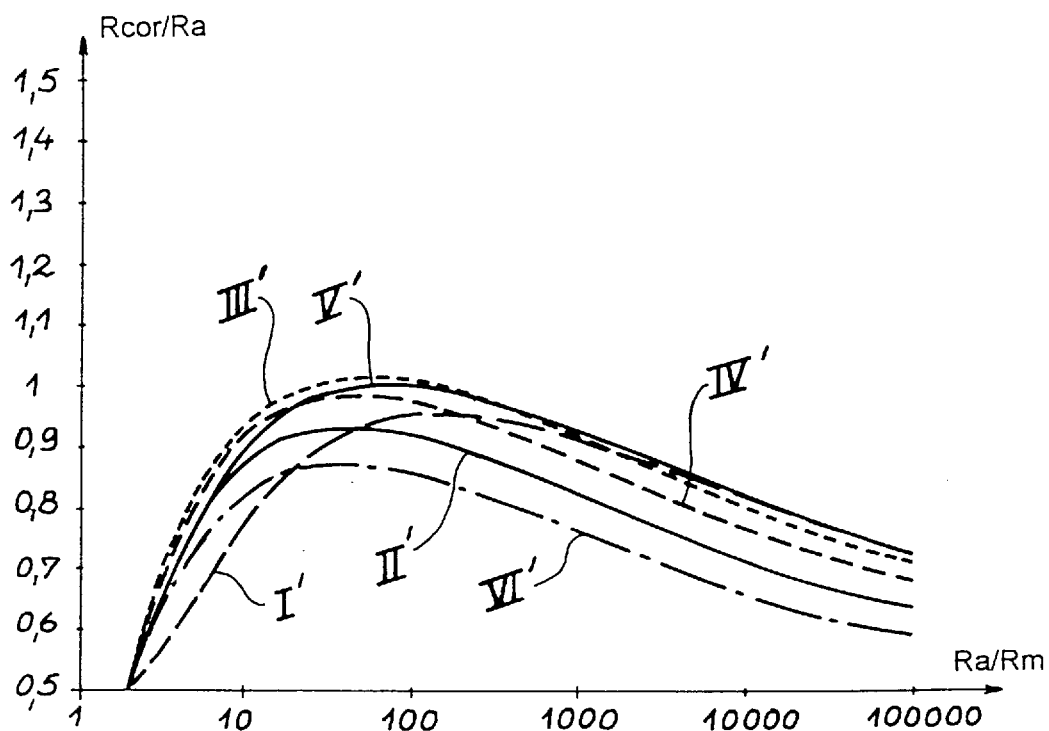

Taking measurements with high resolution increases sensitivity to hole effects, in particular at low contrast (ratio of formation resistivity to mud resistivity <10). In addition, at high contrast, correction becomes more dependent on hole size. Thus, FIGS. 6A and 6B show how the correction factor for the hole effect or the ratio $R_{cor}/R_a$ (where $R_{cor}$ is the true resistivity of the formation and where $R_n$ is the measured resistivity of the medium, before correction) varies as a function of the ratio $R_a/R_m$ (or contrast, where $R_m$ is the resistivity of the mud), for deep computed focusing, respectively at standard resolution and at high resolution. In these figures, the curves I–VI (I'–VI') are given for hole diameter increasing in steps of 5 cm from 15 cm to 40 cm.

Figure 7A:
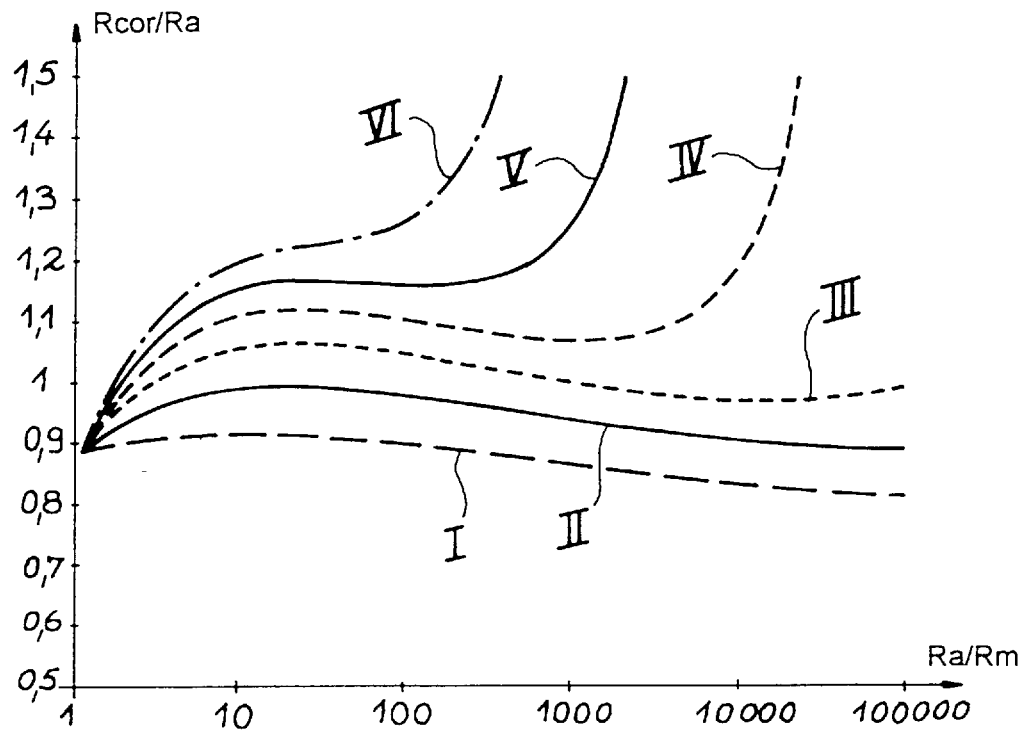
Figure 7B:
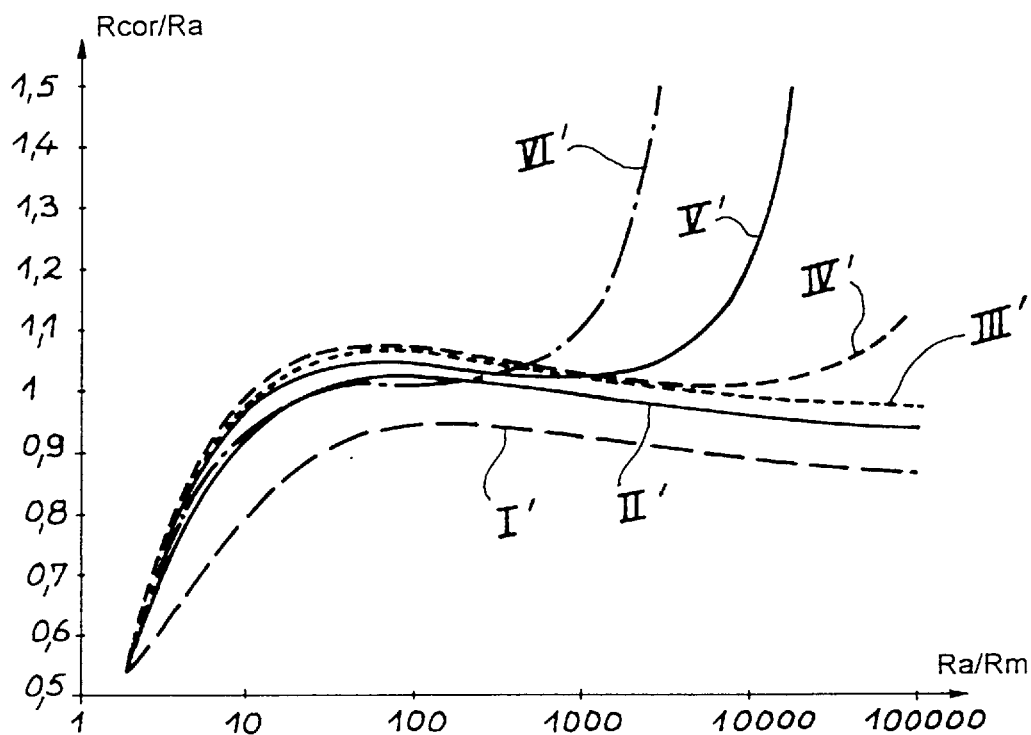

FIGS. 7A and 7B show variation in the same parameter for shallow computed focusing, at standard resolution (FIG. 7A) and at high resolution (FIG. 7B).

Figure 8:
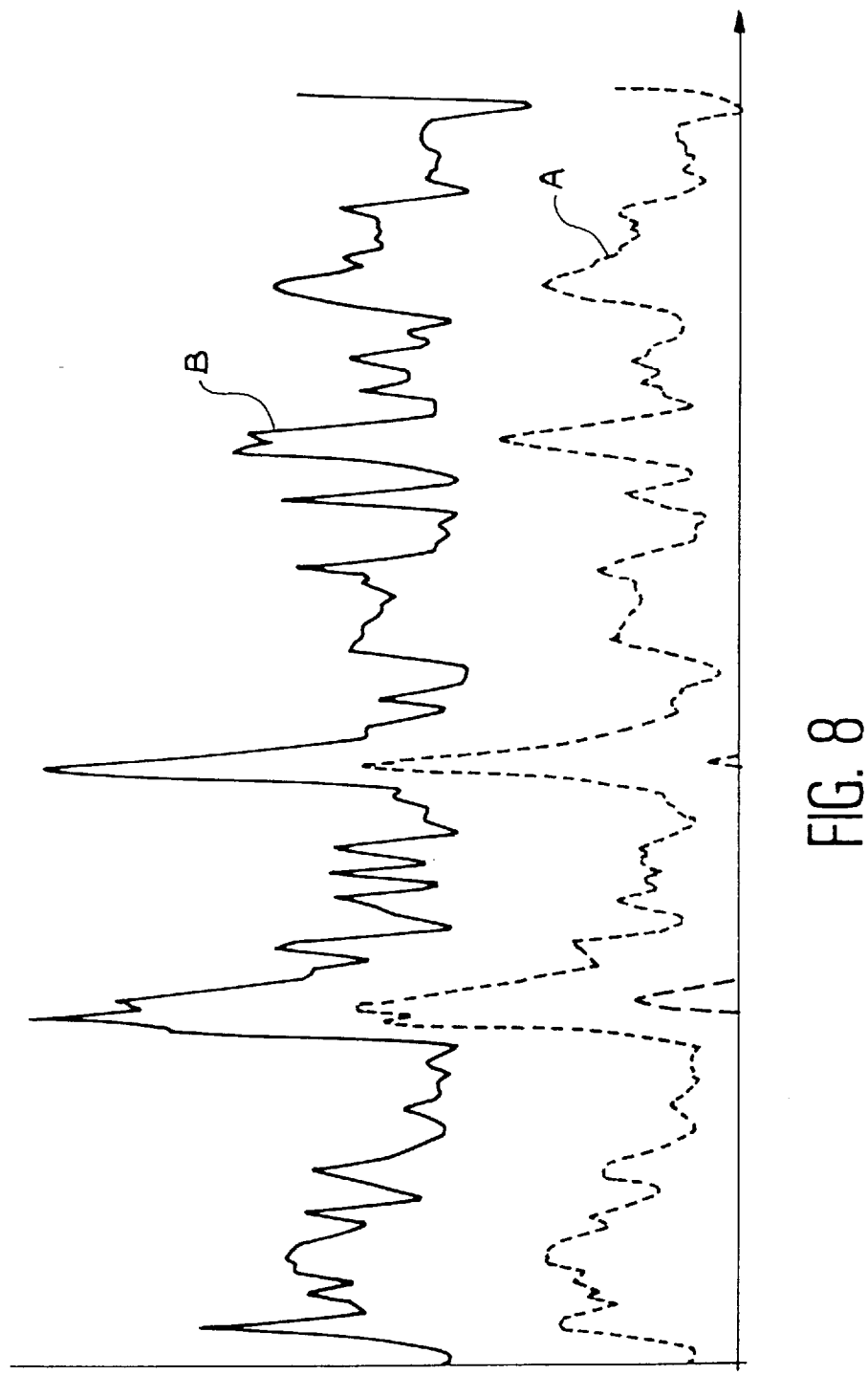
FIG. 8 is a graph showing two logs, at standard resolution and at high resolution.

FIG. 8 shows an example of a log obtained using an apparatus of the prior art at standard resolution (curve A) and using apparatus of the invention at high resolution (curve B). Finer structures are clearly visible in curve B.

Figure 9:
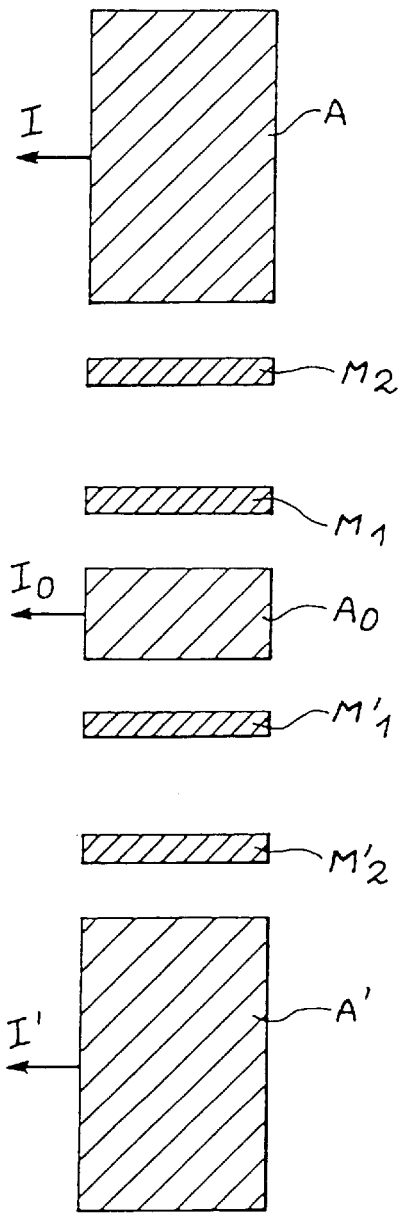
Figure 10:
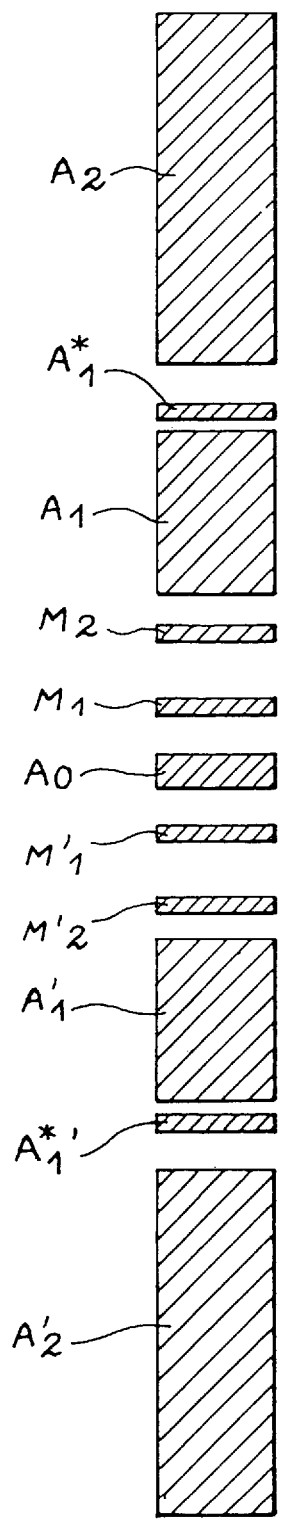

Other embodiments enabling the method of the invention to be implemented are shown in FIGS. 9 and 10. In these two figures, the central portion is the same, i.e.:

an annular single central current electrode $A_0$; and two pairs of annular voltage-measuring electrodes $M_1$, $M'_1$, $M_2$, $M'_2$ disposed on either side of the electrode $A_0$.

The electrode arrangement of FIG. 9 has two guard electrodes A, A' each of which comprises a single piece: this structure makes it possible to implement the effective operating modes described above with reference to FIGS. 3A and 3B, but not the effective mode of FIG. 4A. In contrast, the electrode arrangement of FIG. 10 comprises, on either side of the above-described central assembly, two pairs of annular guard electrodes $A_1$, $A'_1$ and $A_2$, $A'_2$. Annular electrodes $A_1$* and $A_1$*' make it possible to measure potentials in the mud column close to the annular electrodes $A_1$ and $A'_1$. It is possible to establish a potential difference $\Delta V_a$ between the electrodes $A_1$ and $A_2$ and also between the electrodes $A'_1$ and $A'_2$: this electrode structure makes it possible to implement the effective operating modes described above with reference to FIGS. 3A, 3B, 4A, and 4B.

In both cases (FIGS. 9 and 10) the focusing voltage may be given by the difference $V_2 - V_1$, and the sonde voltage is given by the difference $V_1 - V_r$, where $V_i$ (i=1,2) represents the mean voltage of the electrode pair $M_i$, $M'_i$, and $V_r$ is the potential of a remote reference, e.g. on the cable 13.

These two structures do not enable high resolution measurements to be performed since none of the electrodes used for measuring focusing voltage is at the center of the structure. Similarly, neither of these two structures can be used for performing measurements of azimuth resistivity, since neither of them has any azimuth electrodes. The equation given above for measuring the resistivity of the formation continues to be applicable.

The structures of FIGS. 11 and 12 likewise enable a method of the invention to be implemented. These structures comprise:

in FIG. 11: two annular current electrodes $A_0$ and $A'_0$, a central current measuring electrode M0 and two pairs of annular potential measuring electrodes $M_1$, $M'_1$, $M_3$, $M'_3$ disposed on either side of the current electrodes; and in FIG. 12: two current electrodes $A_0$, $A'_0$, a central annular potential measuring electrode $M_0$, a pair of potential measuring annular electrodes $M_1$, $M'_1$ disposed on either side of the current electrodes, and a pair of annular potential measuring electrodes $A_0$*, $A_0$*' disposed in the middles of the current measuring electrodes $A_0$, $A'_0$, and subdividing them into two portions; this disposition makes it possible to perform measurements that are more accurate when contact impedance variations occur at the surfaces of the electrodes $A_0$ and $A'_0$.

These two electrode arrangements include single-piece annular guard electrodes: they are suitable for implementing only the effective operating modes of FIGS. 3A and 3B. In a variant, these one-piece annular electrodes can be replaced by structures of guard electrodes at either end of the sonde similar to the structures of guard electrodes in FIG. 10 ($A_1$, $A_2$, $A'_1$, $A'_2$): such a structure would be suitable for implementing the effective operating modes of FIGS. 3A, 3B and 4A, 4B.

Because of the presence of an annular voltage measuring electrode $M_0$ between two current electrodes in the structures of FIGS. 11 and 12, they are capable of performing high resolution measurements, for the same reason as that explained above with respect to the electrode structure of FIG. 5. It is possible simultaneously to perform high resolution measurement and standard resolution measurement.

In both cases (FIGS. 11, 12) the focusing voltage is equal to $V_1 - V_0$, where $V_1$ is the mean voltage of electrode pair $M_1$, $M'_1$, and $V_0$ is the voltage of electrode $M_0$. The sonde voltage is equal to $V_3 - V_1$ for the structure of FIG. 11 where $V_3$ is the mean voltage of the pair $M_3$, $M'_3$ and it is equal to $V_1-V_r$ for the structure of FIG. 12 where Vr is the potential of a remote reference, e.g. on the cable 13. The expression for the resistivity of the formation is still the same.

When only high resolution measurement is desired (without standard resolution), it is possible to eliminate electrode pair $M_3$, $M'_3$ from the apparatus of FIG. 11.

Figure 13:
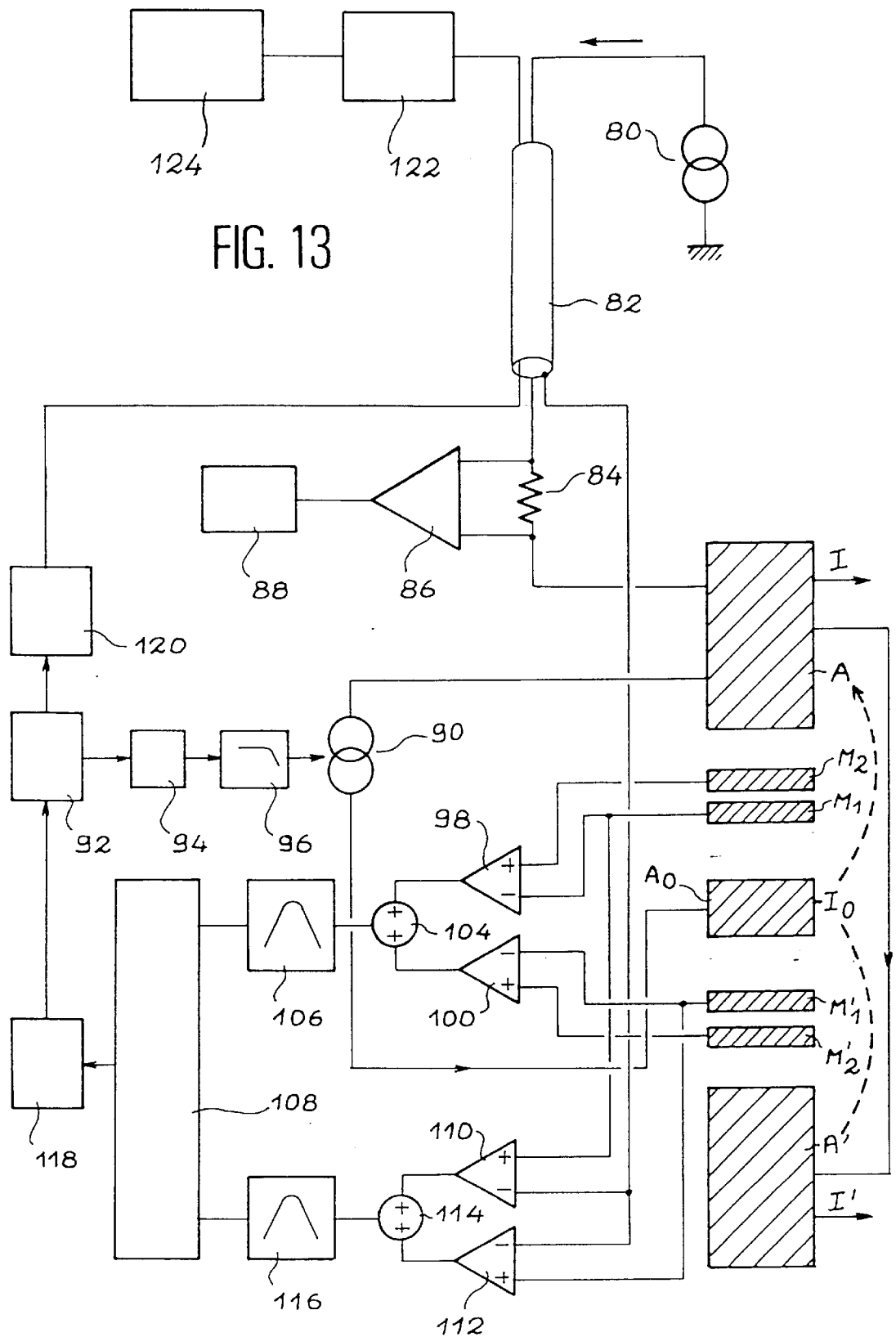
FIG. 13 is a block diagram of the electronics for implementing a method of the present invention.

An electrical circuit for implementing a sonde suitable for performing the measurement method of the invention by computed focusing is shown in FIG. 13. The electrode structure concerned is that described above with reference to FIG. 9. A current source 80, e.g. situated at the surface sends a total current It for operating the sonde in the first effective mode. This current is delivered via a cable 82. Means are provided (resistor 84, amplifier 86, phase measuring circuit 88) for measuring the phase of the current $I_t$. The current I0 (for operation in the second effective mode) is produced by a generator 90 controlled by a digital processor 92, a digital-to-analog converter 94 and a lowpass filter 96. The focusing voltage is obtained by taking a difference and amplifying, using differential amplifiers 98 and 100 which take the differences between the voltages from pairs of annular electrodes $M_1$, $M_2$ and $M'_1$, $M'_2$. The signals from the differential amplifiers are applied to a summing circuit 104 whose output signal is filtered (bandpass filter 106) and is subsequently applied to a multiplier 108. The signals for measuring the sonde voltage are formed by differential amplifiers 110, 112 amplifying the voltage differences between each of the pair of electrodes $M_1$, $M'_1$ and a remote reference voltage, e.g. taken from R on the cable. The resulting signals are fed to a summing circuit 114 whose output is then filtered (bandpass filter 116), and the filtered output signal is subsequently applied to the multiplier 108. The multiplexer is connected to an analog-to-digital converter 118 in turn connected to the digital processor 92. The signal is subsequently conveyed to a transmitter 120. The apparatus also includes a receiver 122 and a computer 124.

When the guard electrodes at either end of the sonde are in two portions each, it may be necessary to impose a zero potential difference between the two portions.

Figure 14:
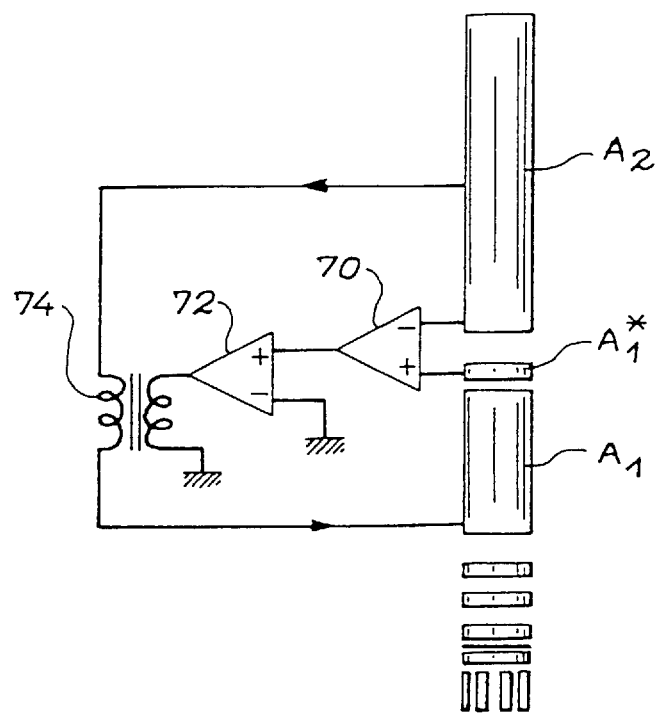
FIG. 14 is an electronic circuit diagram for monitoring the voltage between two guard electrodes.

An electrical circuit for monitoring equality of potential, e.g. between electrodes $A_1^*$ and $A_2$ in FIG. 2, is given in FIG. 14. In this figure, only the top portion of the sonde above electrode $A_0$ is shown. An electrode $A_1^*$ is associated with electrode A, so as to perform potential measurement in the mud column close to $A_1$. This makes it possible to avoid the effects of contact impedance on electrode $A_1$. An amplifier 70 delivers a signal proportional to the voltage measured between the electrode $A_2$ and the electrode $A_1^*$. A differential amplifier 72 serves to compare the resulting signal with ground potential. If there is unbalance between the voltages of electrodes $A_2$ and $A_1^*$, the amplifier 72 delivers a non-zero signal to a transformer 74 which then controls a different distribution of currents between the electrodes $A_1$ and $A_2$. It is thus possible to apply the signal $V_{A1}^*+V_{A1}^*-V_{A2}-V_{A2}'$ to the input of amplifier 70. The electrodes $A_1$ and $A'_1$ and the electrodes $A_2$ and $A'_2$ are then short circuited. All of the elements 70 to 74 can be integrated in the body of the sonde lowered down the borehole.

I claim:

1. A method of measuring the characteristics of formations around a borehole, the method comprising:

inserting into the borehole a sonde (22) having an elongate body (17) provided with at least one annular current electrode ($A_0$, $A'_0$) and at least two annular guard electrodes (A, A', $A_1$, $A'_1$, $A_2$, $A'_2$), situated on either side of the annular current electrode;

in a first effective operating mode of the sonde, emitting a current $i_1$ into the surrounding formation from the annular guard electrode(s) (A, $A_1$, $A_2$) situated at one end of the sonde relative to the current electrode(s) ($A_0$, $A'_0$), and a current $i'_1$ from the other annular guard electrode(s) (A', $A'_1$, $A'_2$) situated at the other end of the sonde relative to the current electrode(s) ($A_0$, $A'_0$), the current $I_{0,1}$ emitted by the annular current electrode(s) being equal to 0;

in a second effective operating mode, emitting at least one current $I_{0,2}$ from the annular current electrode(s) ($A_0$, $A'_0$) towards the annular guard electrodes (A, A', $A_1$, $A'_1$, $A_2$, $A'_2$), the total current $I_{t,2}$ emitted from the sonde into the formation being equal to 0; and performing computed focusing on the basis of the above two effective operating modes to simulate an operating mode in which:

at least one current $I_{0,c}$ is emitted into the surrounding formation from the annular current electrode(s) ($A_0$, $A'_0$); and the current $I_{0,c}$ is focused in the formation by emitting two currents $I_{1,c}$ and $I'_{1,c}$ from the two annular guard electrodes (A, A', $A_1$, $A'_1$, $A_2$, $A'_2$) situated on either side of the annular current electrode.

2. A method according to claim 1:

in which, in each effective operating mode, signals are produced representative of a focusing voltage $\Delta V_{f,i}$(i=1,2) together with a sonde voltage $\Delta V_{s,i}$(i=1,2); and in the second mode, a signal is produced representative of the current(s) $I_{0,2}$ emitted from the current electrode(s).

3. A method according to claim 2, in which a signal representative of the resistivity of the formation (11) is produced from the ratio:

$$\frac{\Delta V_{s,2} - \left(\frac{\Delta V_{f,2}}{\Delta V_{f,1}} \Delta V_{s,1}\right)}{I_{0,2}}$$

4. A method according to claim 2, in which a weighting coefficient ($\lambda$) is deduced for performing a linear combination of the two effective operating modes of et sonde in order to obtain a computed mode in which the resulting focusing voltage $\Delta V_{f,c}$ is zero.

5. A method according to claim 2, in which, in the first mode, there is also produced a signal representative of total current $I_{t,1}$ emitted into the formation, and in which transfer impedances or coefficients are deduced between:

firstly the focusing voltage $\Delta V_{f,i}$(i=1,2) and the sonde voltage $\Delta V_{s,i}$; and secondly the current emitted from the current electrode(s) $I_{0,i}$ and the total current $I_{t,i}$ emitted into the formation.

6. A method according to claim 2, the sonde including:

two annular current electrodes ($A_0$, $A'_0$); and an array of N azimuth electrodes ($A_{azi}$) disposed between the two current electrodes ($A_0$, $A'_0$); and first and second pairs of annular potential measuring electrodes ($M_1$, $M'_1$, $A_0^*$, $A_0^{*'}$);

the focusing voltage $\Delta V_f$ being equal to the difference $V_1-\langle V_{azi}\rangle$ between the mean voltage of the first pair of annular potential measuring electrodes ($M_1$, $M'_1$) and the mean voltage of the array of azimuth electrodes;

the sonde voltage $\Delta V_S$ being equal to the difference between the mean voltage of the first pair of annular potential measuring electrodes ($M_1$, $M'_1$) and the potential $V_r$ of a remote reference; and at least one signal being produced that is representative of the azimuth resistivity of the formation in at least one direction around the sonde as defined by one of the azimuth electrodes.

7. A method according to claim 6, signals representative of N voltages $\Delta V_{azi,1}$ and $\Delta V_{azi,2}$ (i=1, ..., N) of the azimuth electrodes being produced for both effective operating modes, the azimuth resistivity of the formation in direction k being deduced from the expression:

$$\frac{\Delta V_{s,2} - \left(\frac{\Delta V_{f,2}}{\Delta V_{f,1}} \Delta V_{s,1}\right)}{I_{0,2}} \quad \frac{\sum_{i=1}^{N}\left(\Delta V_{azi,2} - \frac{\Delta V_{f,2}}{\Delta V_{f,1}} \Delta V_{azi,1}\right)}{N\left(\Delta V_{azk,2} - \frac{\Delta V_{f,2}}{\Delta V_{f,1}} \Delta V_{azk,1}\right)}$$

8. A method according to claim 1, the sonde including:
a single current electrode ($A_0$);
first and second pairs of potential measuring electrodes ($M_1$, $M'_1$; $M_2$, $M'_2$) disposed on either side of the current electrode ($A_0$);
the focusing voltage $\Delta F_f$ being equal to the difference $V_1 - V_2$ of the mean voltages of the first and second pairs of potential measuring electrodes ($M_1$, $M'_1$; $M_2$, $M'_2$); and
the sonde voltage $\Delta V_S$ being equal to the difference $V_1 - V_r$ between the mean voltage of the first pair of potential measuring electrodes ($M_1$, $M'_1$) and the potential of a remote reference.

9. A method according to claim 1, the sonde comprising:
two annular current electrodes ($A_0$, $A'_0$); and
either an annular potential electrode $M_0$ disposed between the two current electrodes;
or else an array of azimuth electrodes ($A_{azi}$) disposed between the two current electrodes;
together with first and second pairs of annular potential measuring electrodes ($M_1$, $M'_1$; $A_0^*$, $A_0^{*'}$).

10. A method according to claim 9, in which:
the focusing voltage is equal to the difference between the mean voltage $V_1$ of the first pair of annular potential measuring electrodes and either the voltage $V_0$ of the annular potential electrode disposed between the two current electrodes or the mean voltage $<V_{asi}>$ of the array of azimuth electrodes; and
the sonde voltage is equal to the difference $V_1 - V_r$ between the voltage of the first pair of annular potential measuring electrodes ($M_1$, $M'_1$) and the remote reference potential.

11. A method of measuring the characteristics of formations around a borehole, the method comprising:
inserting a sonde (22) into the borehole, the sonde having an elongate body (17) provided with at least one annular current electrode ($A_0$, $A'_0$);
towards a first end relative to the current electrode(s) ($A_0$, $A'_0$), first and second annular guard electrodes ($A_1$, $A_2$); and
towards the other end relative to the current electrode(s), third and fourth annular guard electrodes ($A'_1$, $A'_2$);
in a first effective operating mode, emitting:
currents $i_2$, $i'_2$ from the first and third annular guard electrodes ($A_1$, $A'_1$) towards the second and fourth annular guard electrodes ($A_2$, $A'_2$); and
the current $I_{0,1}$ emitted from the annular current electrode(s) and the total current $I_{t,1}$ emitted from the sonde into the formation both being equal to 0; and in a second effective operating mode, emitting at least one current $I_{0,2}$ from the annular current electrode(s) ($A_0$, $A'_0$) towards the annular guard electrodes ($A_1$, $A'_1$, $A_2$, $A'_2$), the total current $I_{t,2}$ emitted from the sonde into the formation being equal to 0; and
performing computed focusing to simulate an operating mode in which:
at least one current $I_{0,c}$ is emitted into the surrounding formation from the annular current electrode(s); and
the current $I_{0,c}$ is focused in the formation by emitting two currents $I_{1,c}$ and $I'_{1,c}$ from the annular guard electrodes.

12. A method according to claim 11, in which, in each effective operating mode, signals are produced representative of a focusing voltage $\Delta V_{f,i}$ (i=1,2) together with a sonde voltage $\Delta V_{s,i}$ (i=1,2);
in the second mode, a signal is produced representative of the current(s) $I_{0,2}$ emitted from the current electrode(s); and
in which, in the first mode, there are also produced signals representative of the voltage differences $\Delta V_{a,1}$, $\Delta V'_{a,1}$ between firstly the first and second guard electrodes ($A_1$, $A_2$) and secondly the third and fourth guard electrodes ($A'_1$, $A'_2$) and in which transfer impedances or coefficients are deduced between:
firstly the focusing voltage $\Delta V_{f,i}$ (i=1,2) and the sonde voltage $\Delta V_{s,i}$; and
secondly the current $I_0$,i emitted from the current electrode(s) and the voltage difference $\Delta V_{a,i}$, $\Delta V'_{a,i}$ between two guard electrodes.

13. Apparatus for measuring the characteristics of formations around a borehole, the apparatus comprising:
a sonde (22) having an elongate body (17) provided with at least one annular current electrode ($A_0$, $A'_0$) and at least two annular guard electrodes (A, A', $A_1$, $A'_1$, $A_2$, $A'_2$), situated on either side of the annular current electrode;
means for use in a first effective operating mode to emit a current $i_1$ into the surrounding formation from one of the annular guard electrodes, and a current $i'_1$ from the other annular guard electrode, the current $I_{0,1}$ emitted by the annular current electrode(s) being equal to 0;
means for use in a second effective operating mode to emit at least one current $I_{0,2}$ from the annular current electrode(s) ($A_0$, $A'_0$) towards the annular guard electrodes (A, A', $A_1$, $A'_1$, $A_2$, $A'_2$), the total current $I_{t,2}$ emitted from the sonde into the formation being equal to 0; and
means for use in both of the above effective operating modes to perform computed focusing in such a manner as to simulate an operating mode in which:
at least one current $I_{0,c}$ is emitted into the surrounding formation from the annular current electrode(s) ($A_0$, $A'_0$); and
the current $I_{0,c}$ is focused in the formation by emitting two currents $I_{1,c}$ and $I'_{1,c}$ from the two annular guard electrodes situated on either side of the annular current electrode.

14. Apparatus according to claim 13, in which means are provided to produce:
in each mode, signals representative of a focusing voltage $\Delta V_{f,i}$ (i=1,2) and of a sonde voltage $\Delta V_{s,i}$ (i=1,2); and
in the second mode, a signal representative of the current (s) $I_{0,2}$ emitted from the current electrode(s).

15. Apparatus according to claim 14, in which means are provided to produce a signal representative of the resistivity of the formation on the basis of the ratio:

$$\frac{\Delta V_{s,2} - \left( \frac{\Delta V_{f,2}}{\Delta V_{f,1}} \Delta V_{s,1} \right)}{I_{0,2}}$$

16. Apparatus according to claim 14, the means for performing computed focusing serving to deduce a weighting coefficient ($\lambda$) for a linear combination of the two effective operating modes of the sonde so as to obtain a computed mode in which the resulting focusing voltage $\Delta V_{f,c}$ is zero.

17. Apparatus according to claim 14,
means being provided in the first effective operating mode to produce a signal representative of the total current $I_{t,i}$ (i=1,2) emitted into the formation; and
means for performing computed focusing enabling transfer impedances or coefficients to be deduced between:
firstly the focusing voltage $\Delta V_{f,i}$ (i=1,2) and the sonde voltage $\Delta V_{S,i}$; and
secondly the current $I_{0,i}$ emitted from the current electrode(s) and the total current $I_{t,i}$ emitted into the formation.

18. Apparatus according to claim 14;
the sonde comprising:
two annular current electrodes ($A_0, A'_0$); and
an array of N azimuth electrodes ($A_{azi}$), disposed between the two current electrodes;
together with first and second pairs of annular potential measuring electrodes ($M_1, M'_1; A_0^*, A_0^{*'}$);
the apparatus further comprising means for producing at least one signal representative of the azimuth resistivity of the formation in at least one direction around the sonde, as defined by one of the azimuth electrodes.

19. Apparatus according to claim 13, the sonde comprising:
a single current electrode ($A_0$); and
first and second pairs of potential measuring electrodes ($M_1, M'_1; M_2, M'_2$) disposed on either side of the current electrode ($A_0$).

20. Apparatus according to claim 13, the sonde comprising:
two annular current electrodes ($A_0, A'_0$):
either a single annular potential electrode ($M_0$) disposed between the two current electrodes;
or else an array of azimuth electrodes ($A_{azi}$) disposed between the two current electrodes, together with first and second pairs of annular potential measuring electrodes ($M_1, M'_1; A_0^*, A_0^{*'}$), one of the two pairs being situated on either side of the annular current electrodes.

21. Apparatus for measuring the characteristics of formations around a borehole, the apparatus comprising:
a sonde (22) having an elongate body (17) provided with at least one annular current electrode ($A_0, A'_0$):
towards one end relative to the current electrode(s), first and second annular guard electrodes ($A_1, A_2$); and
towards the other end relative to the current electrode (s), third and fourth annular guard electrodes ($A'_1, A'_2$);
means for use in a first effective operating mode to emit:
currents $i_2$, $i'_2$ from the first and third annular guard electrodes ($A_1, A'_1$) towards the second and fourth annular guard electrodes ($A_2, A'_2$); and
the current $I_{0,i}$ emitted from the annular current electrode(s) and the total current $I_{t,1}$ emitted from the sonde into the formation both being equal to 0;
means for use in a second effective operating mode to emit at least one current $I_{0,2}$ from the annular current electrode(s) towards the annular guard electrodes, the total current $I_{t,2}$ emitted from the sonde into the formation being equal to 0; and
means for implementing computed focusing on the basis of the two above effective operating modes so as to simulate an operating mode in which:
at least one current $I_{0,c}$ is emitted into the surrounding formation from the annular current electrode; and
the current $I_{0,c}$ is focused in the formation by emitting two currents $I_{1,c}$ and $I'_{1,c}$ from the two annular guard electrodes situated on either side of the annular current electrode.

22. Apparatus according to claim 21, in which means are provided to produce:
in each mode, signals representative of a focusing voltage $\Delta V_{f,i}$ (i=1,2) and of a sonde voltage $\Delta V_{S,i}$ (i=1,2); and
in the second mode, a signal representative of the current (s) $I_{0,2}$ emitted from the current electrode(s);
means being provided for the first effective operating mode to produce a signal representative of voltage differences $\Delta V_{a,i}$, $\Delta V'_{a,i}$ between firstly the first and second guard electrodes ($A_1, A_2$) and secondly the third and fourth guard electrodes ($A'_1, A'_2$); and
means for performing computed focusing enabling transfer impedances or coefficients to be deduced between:
firstly the focusing voltage $\Delta V_{f,i}$ and the sonde voltage $\Delta V_{S,i}$; and
secondly the current $I_{0,i}$ emitted from the current electrode(s) and the voltage difference $\Delta V_{a,i}$, $\Delta V'_{a,i}$ between the two guard electrodes.

23. Apparatus for measuring the characteristics of formations around a borehole, the apparatus comprising:
a sonde (22) having an elongate body (17) provided with
at least one annular current electrode ($A_0, A'_0$);
at one end relative to the current electrode(s) first and second annular guard electrodes ($A_1, A_2$); and
at the other end relative to the current electrode(s), third and fourth annular guard electrodes ($A'_1, A'_2$);
means for use in a first effective operating mode to emit a current $i_1$ into the surrounding formation from the first and second annular guard electrodes, and for emitting a current $i'_1$ from the third and fourth annular guard electrodes, the current $I_{0,1}$ emitted by the annular current electrode(s) being equal to 0;
means for use in a second effective operating mode to emit:
currents $i_2$ and $i'_2$ from the first and third annular guard electrodes ($A_1, A'_1$) towards the second and fourth annular guard electrodes ($A_2, A'_2$); and
the current $I_{0,1}$ emitted from the annular current electrode(s) and the total current $I_{t,1}$ emitted from the sonde into the formation both being equal to 0;
means for use in a third effective operating mode to emit at least one current $I_{0,2}$ from the annular current electrode(s) ($A_0, A'_0$) towards the annular guard electrodes ($A, A', A_1, A'_1, A_2, A'_2$), the total current $I_{t,2}$ emitted from the sonde into the formation being equal to 0; and means for performing one or more computed focusing operations on the basis of the effective operating modes so as to simulate one or more operating modes in which:

at least one current $I_{0,c}$ is emitted into the surrounding formation from the annular current electrode ($A_0$, $A'_0$); and the current $I_{0,c}$ is focused in the formation by emitting two currents $I_{1,c}$ and $I'_{1,c}$ from the two annular guard electrodes situated on either side of the annular current electrode.

* * * * *